United States Patent [19]

Nakanishi et al.

[11] 4,225,560
[45] Sep. 30, 1980

[54] NUCLEAR FUEL REPROCESSING APPARATUS

[75] Inventors: Takenori Nakanishi; Yuji Yoshikawa, both of Tokyo; Takao Tagaeto, Yokohama, all of Japan

[73] Assignee: Ishikawajima-Harima Jukogyo Kabushiki Kaisha, Tokyo, Japan

[21] Appl. No.: 816,736

[22] Filed: Jul. 18, 1977

[30] Foreign Application Priority Data

Apr. 1, 1977 [JP] Japan ................... 52-37908

[51] Int. Cl.$^2$ ................ G21C 19/48; G21C 19/44
[52] U.S. Cl. .................... 422/159; 422/903; 423/260; 423/261
[58] Field of Search .............. 252/301.15; 209/11, 209/238; 23/277 R, 252 R, 284; 266/177, 176; 423/260, 261; 422/159

[56] References Cited

U.S. PATENT DOCUMENTS

| 2,900,179 | 8/1959 | Kaufmann | 266/177 |
| 3,193,273 | 7/1965 | Miller et al. | 266/177 |
| 3,580,555 | 5/1971 | Gearhart | 266/250 |

FOREIGN PATENT DOCUMENTS 1297158 11/1972 United Kingdom ............ 423/261

OTHER PUBLICATIONS

Burris, L. et al, "Pyrometallurgical and Pyrochemical Fuel Processing", Proc. 3rd Int'l. Conf. on Peaceful Uses Atomic Energy, 1965, pp. 5-1-507.

Primary Examiner—Benjamin R. Padgett
Assistant Examiner—Deborah L. Kyle
Attorney, Agent, or Firm—Scrivener, Parker, Scrivener and Clarke

[57] ABSTRACT

According to one embodiment of the present invention, the oxygen gas is introduced into a horizontal, unitary and totally-closed furnace shell, and nuclear fuel to be reprocessed is charged onto an oxidation and separation plate which is horizontally disposed for vibration within the furnace shell along the axis, so that the nuclear fuel may be reprocessed by oxidation in the oxygen atmosphere while the fuel is vibrated and transported on the oxidation and separation plate and the reprocessed nuclear fuel in the form of particles may be discharged. At the same time released volatile fission products from the pulverized fuel are isolated by means of a vacuum blower. According to another embodiment of the present invention, a reduction furnace which is substantially similar in construction to the oxidation furnace described above except that a reducing gas is supplied by an independent source. If this reduction furnace connects with the oxidation furnace, the cyclic reprocessing of nuclear fuel may be effected through the oxidation and reduction furnaces.

In this specification the term "nuclear fuel" refers to both irradiated and not-irradiated nuclear fuels including or not including their sheaths.

2 Claims, 3 Drawing Figures

NUCLEAR FUEL REPROCESSING APPARATUS

DETAILED DESCRIPTION OF THE INVENTION

Nuclear fuels in themselves are radioactive so that the operation of the nuclear fuel reprocessing must be completely safeguarded and the release of the radioactive contaminants to the environment must be avoided at any cost. Furthermore, the apparatus for nuclear fuel reprocessing must be so designed and constructed that the maintenance and repairs of the apparatus may be eliminated and accordingly the operators may be free of radioactive contamination.

Figure 1:
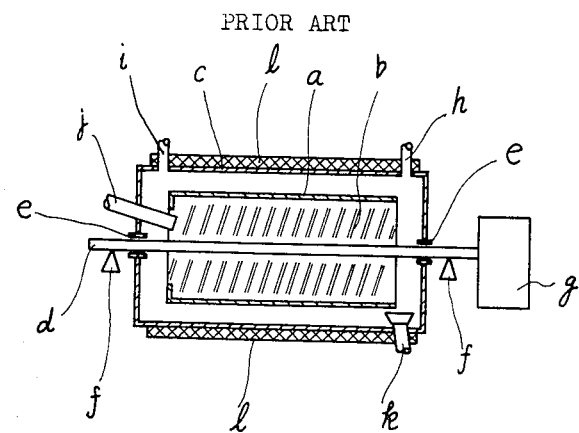

In FIG. 1 there is shown a conventional type nuclear fuel reprocessing apparatus as an oxidation furnace wherein a rotary drum a with a plurality of inclined fins b is carried by a rotary shaft d supported by bearings f and driven by a low-speed driving device g. The rotary drum a is completely enclosed within an outer furnace shell c covered with a thermally insulating material 1 through which embed heating coils (not shown). Grand seals e are gas-tightly interposed between the rotary shaft d and the outer furnace shell c so that the leakage of the oxygen gas introduced into the outer furnace shell c through an oxygen gas supply pipe h may be prevented. The outer furnace shell c is provided with a discharge pipe i, a fuel feeding pipe j and a fuel discharge pipe k.

In operation, nuclear fuel to be reprocessed is fed through the fuel feeding pipe j into the rotary drum a which is rotated at a low speed by the low-speed driving device g while the oxygen gas or air is supplied through the oxygen gas supply pipe h into the outer furnace shell c so that the nuclear fuel is oxidized and is converted into fine particles. The fine particles are transported through the rotary drum a by the inclined fins b toward the fuel discharge pipe k. The inclined fins b also serve to agitate the nuclear fuel so as to facilitate its oxidation.

However the conventional type nuclear fuel reprocessing apparatus as an oxidation furnace described above has some problems. First the rotary shaft d is made into sliding contact with the grand seals e so that it is impossible to completely eliminate the leakage of the radioactive contaminants through the clearances of the grand seals e between the rotary shaft d and the outer furnace shell c. In addition, the grand seals must be replaced at a predetermined time interval so that there exists a very serious danger that the operators may be contaminated with the radioactive particles.

In addition to the oxidation furnace, a reduction furnace is also used in the nuclear fuel processing. The reduction furnace is substantially similar in construction to the oxidation furnace described above except that instead of the oxygen gas or air, a reducing gas is supplied into the furnace. As a result, the reduction furnace has the same problems as the oxidation furnace.

In view of the above, one of the objects of the present invention is to provide a nuclear fuel reprocessing apparatus which can completely overcome the problem of radioactive contamination, can ensure the safeguarded operations and can eliminate the maintenance and repair which otherwise lead to the contamination of the operators and the environment.

Figure 2:
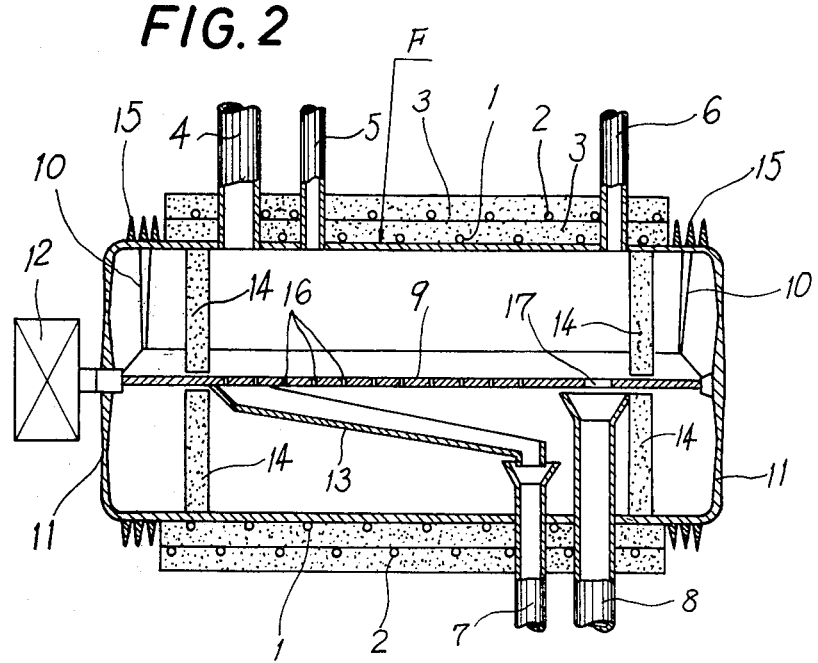
Figure 3:
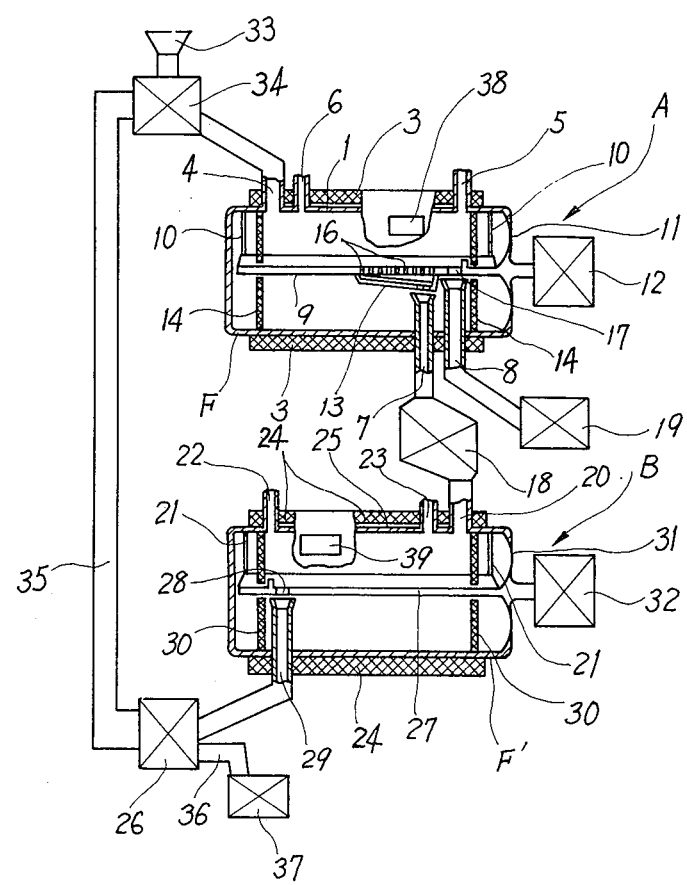

The present invention will become more apparent from the following description of two preferred embodiments thereof taken in conjunction with the accompanying drawings, in which:

FIG. 1 is a schematic sectional view of a conventional nuclear fuel reprocessing apparatus; and FIGS. 2 and 3 are schematic sectional views of first and second embodiments, respectively, of a nuclear fuel reprocessing apparatus in accordance with the present invention.

FIRST EMBODIMENT, FIG. 2

Referring to FIG. 2, a nuclear fuel reprocessing apparatus in accordance with the present invention has a horizontally disposed furnace main body comprising a unitary shell F of totaly-closed construction with integrally formed end walls 11 which serve as diaphragms. The exterior wall of the shell F is covered with a heat insulating layer 3 into which embed heating and cooling coils 1 and 2 for controlling the furnace temperature. The shell F is provided with a plurality of cooling fins 15 at both end of the shell F and a nuclear fuel feeding pipe 4, an oxygen supply pipe 5 and an exhaust gas discharge pipe 6 all of which are extended upwardly. The furnace shell F is further provided with a first fuel discharge port 7 for discharging particles of reprocessed nuclear fuel and a second fuel discharge port 8 for discharging nuclear fuel of large size and their sheaths, both the first and second fuel discharge ports 7 and 8 being extended downwardly.

An oxidation and separation plate 9 which has a large number of small holes 16 through which the reprocessed fuel particles drop and a discharge hole 17 through which the reprocessed fuel of large size and their sheaths are dropped into the second discharge port 8, is horizontally disposed within the furnace shell F along the axis thereof, inclined at a small angle in the axial direction, suspended by hangers 10 and operatively coupled at both ends to the diaphragm end walls 11. A vibrator 12 is disposed exterior of the furnace shell F and is drivingly coupled to the oxidation and separation plate 9 through the diaphragm-like end wall 11 so that the oxidation and separation plate 9 may be vibrated by the vibrator 12. The amplitude and frequency of the vibrator 12 may be fixed or adjustable if necessary.

An inclined guide plate 13 is extended below the oxidation and separation plate 9 so that the reprocessed nuclear fuel particles dropping through the small holes 16 of the plate 9 upon the guide plate 13 may be positively directed toward the first discharge port 7. Thermal insulating partition walls 14 are vertically disposed within the furnace shell F and are axially spaced and apart from the diaphragm end walls 11 at a suitable distance in order to thermally isolate the diaphragm end walls 11 and to prevent the undesired heat dissipation.

The first embodiment with the above construction features the horizontally disposed, totally-closed furnace shell F of unitary construction and the vibration of the oxidation and separation plate 9 by means of the vibrator 12 during the nuclear fuel reprocessing.

Next the mode of operation of the first embodiment will be described below. The nuclear fuel to be reprocessed is charged through the nuclear fuel feeding pipe 4 onto the oxidation and separation plate 9 in the furnace shell F, and is heated to 450° to 750° C. in the oxygen atmosphere by the heat generated by the heating coils 1, the decay heat of the nuclear fuel and the heat produced as a result of the oxidation. As a consequence, the oxidation proceeds from the sheared ends of the sheaths.

When the nuclear fuel to be reprocessed contains plutonium, the oxidation proceeds as follows:

$$(U, Pu)O_2 + O_2 \rightarrow (U, Pu)O_{2+x}$$

but when no plutonium is contained, the oxidation proceeds as follows:

$$UO_2 + O_2 \rightarrow UO_{2+x}$$

As a result of the oxidation with the vibration, the nuclear fuel is pulverized, and volatile fission products are vaporized and separated from the nuclear fuel. The vapor of volatile fission products is discharged through the exhaust gas discharge pipe 6. The pulverized nuclear fuel is separated from the sheaths by the vibration of the oxidation and separation plate 9 caused by the vibrator 12, drops through the small holes 16 of the plate 9 onto the guide plate 13, and is directed toward the first discharge port 7 because the guide plate 13 is inclined and is vibrated since it is connected with the oxidation and separation plate 9. On the other hand, the lump solids such as sheaths remain on the upper surface of the oxidation and separation plate 9 and are gradually moved toward the discharge hole 17 to drop into the second discharge port 8.

SECOND EMBODIMENT, FIG. 3

In the second embodiment shown in FIG. 3, the oxidation furnace A described above is combined with a reduction furnace B so that the cyclic nuclear fuel processing may be accomplished.

As described above the oxidation furnace A is substantially similar in construction to the oxidation furnace described in conjunction with FIG. 2, but the first discharge port 7 through which the pulverized nuclear fuel is discharged is connected to a particle transfer device 18 through which the particles are charged into the reduction furnace B. The particle transfer device 18 may incorporate suitable means (not shown) to prevent the mixing of the oxidizing and reducing gases from the oxidation and reduction furnaces A and B.

The second discharge port 8 of the oxidation furnace A is connected with a closed receptacle 19 for receiving therein the reprocessing fuel of large size and sheaths discharged through the second discharge port 8.

The reduction furnace B is substantially similar in construction to the oxidation furnace A. That is, a furnace shell F' is of a horizontal, unitary and toally-closed type and is provided with a nuclear fuel feeding pipe 20 connected to the particle transfer device 18, a reducing gas supply pipe 22 and an exhaust gas discharge pipe 23, these pipes 20 and 22 extending upwardly. The exterior wall of the furnace shell F' is covered with a heat insulating layer 24 through which embed heating coils 25.

A reduction plate 27 is extended axially substantially along the axis of the reduction furnace shell F' and is suspended by hangers 21. The reduction plate 27 is formed at its downstream end with a discharge hole 28 which in turn is connected with a reprocessed fuel discharge pipe 29 extending vertically below the reduction plate 27 and through the furnace shell F'.

Thermal insulating partition walls 30 are vertically disposed within the furnace shell F' and are axially spaced from diaphragm end walls 31 integral with the furnace shell F' in such a manner that they will not interfere with the flow of particles on the reduction plate 27 and they also prevent the dissipation of heat from the interior to the exterior of the reduction furnace B.

A vibrator 32 is disposed outside of the reduction furnace B and is drivingly connected through one of the diaphragm end walls 31 to the reduction plate 27 so that the latter may be vibrated and the fuel particles thereon may be agitated and transferred toward the discharge hole 28. As in the first embodiment, the vibration frequency of the vibrator 32 may be fixed or may be adjustable if necessary.

The fuel feeding pipe 4 of the oxidation furnace A is connected to a nuclear fuel charging device 34 having a hopper 33 so that a predetermined quantity or batch of nuclear fuel to be processed may be charged into the oxidation furnace A.

The discharge pipe 29 of the reduction furnace B is connected to a processed particle flow directional control device 26 which in turn is connected through ducts 35 and 36 to the nuclear fuel supply device 34 and a closed receptacle 37 for receiving therein processed nuclear fuel particles. When the size of the particles of nuclear fuel reprocessed in the reduction furnace B is not fine, the directional control device 26 transfers the particles through the duct 35 to the nuclear fuel charging device 34 so that the particles may be processed again in both the oxidation and reduction furnaces A and B. When the size of the particles discharged from the reduction furnace B is acceptable, the directional control device 26 directs them through the duct 36 into the receptacle 37.

In addition to the above arrangement, both the oxidation and reduction furnaces A and B are provided with inspection windows 38 and 39 so that the operators may visually monitor the processing processes carried out in the oxidation and reduction furnaces A and B.

Next the mode of operation of the second embodiment will be described below. First the vibrators 12 and 32 are energized to cause the vibration of the oxidation and separation plate 9 and the reduction plate 27. The nuclear fuel to be processed which is held in the hopper 33 is weighed or otherwise batched in a predetermined amount by the nuclear fuel charging device 34 and is charged through the feeding pipe 4 onto the oxidation and separation plate 9. The charged nuclear fuel is subjected to oxidation and separation in a manner substantially similar to that described above in conjunction with the first embodiment, and the processed nuclear fuel in the form of particles is discharged through the first discharge port 7 into the transfer device 18; the processed nuclear fuel of large size or the like is discharged through the second discharge port 8 into the closed receptacle 19; and the vapor of volatile fission products is discharged through the exhaust pipe 6.

The particles are charged from the transfer device 18 through the feeding pipe 20 into the reduction furnace B and are dropped onto the reduction plate 27 which is vibrated by the vibrator 32. The charged particles are gradually moved toward the discharge hole 28 on the reduction plate 27.

A reducing gas is supplied into the reduction furnace B through the reducing gas supply pipe 22 and is made to flow in countercurrent relationship with the particles on the reduction plate 27 to be discharged through the exhaust gas discharge pipe 23.

In the reducing gas atmosphere thus created, the particles are heated to temperature in excess of 700° C. by the heating coils 25 and are reduced.

When the nuclear fuel to be processed contains plutonium, the reduction proceeds as follows:

$$(U, Pu)O_{2+x} + H_2 \rightarrow (U, Pu)O_2 + H_2O$$

but when the nuclear fuel to be processed contains no plutonium, the reaction proceeds as follows:

$$UO_{2+x} + H_2 \rightarrow UO_2 + H_2O$$

As in the oxidation furnace A, the reduction of nuclear fuel particles is much facilitated by the vibration of the reduction plate 27 in the reduction furnace B. H₂O, which is one of the reduction products is discharged together with other gases through the exhaust gas discharge pipe 23.

The reduced particles are finally discharged through the discharge hole 28 of the reduction plate 27 and the discharge pipe 29 into the directional control device 26. When no further processing is required, the discharged particles are directed through the duct 36 into the closed receptacle 37. However, when a further processing cycle is required in order to reduce the particle size of processed nuclear fuel, the directional control device 26 causes the particles to flow through the duct 35 into the nuclear fuel feeding device 34 so that the particles may be processed again in the manner described above through the oxidation and reduction furnaces A and B.

So far the second embodiment has been described as having no cooling coils 2 which are incorporated in the oxidation furnace shown in FIG. 2, but it will be understood that these coils may be also incorporated in the reduction furnace B so as to control the furnace temperature. In the second embodiment the nuclear fuel is cyclically reprocessed through the oxidation and reduction furnaces A and B, but when it is not necessary to separate the lumps of nuclear fuel which has not been sufficiently oxidized an additional oxidation furnace may be used instead of the reduction furnace B. (In this case, it is apparent that instead of a reducing gas, the oxygen gas is supplied into the furnace.) Furthermore, various modifications may be effected without departing from the basic idea of the present invention.

Effects, features and advantages of the nuclear fuel reprocessing apparatus or installation in accordance with the present invention may be summarized as follows.

(I) Neither the oxidation or reduction furnaces include rotating parts so that the furnace shell is not required to be formed with the grand sealing mountings or receiving portions and consequently the leakage of the radioactive contaminants may be eliminated. Thus, the safe operation may be ensured.

(II) Neither the oxidation and reduction furnaces include rotating parts which must be periodically inspected, and replaced or repaired so that the maintenance and repairs of the furnaces may be substantially eliminated.

(III) In both of the oxidation and reduction furnaces, the nuclear fuel is subjected to vibration and is moved through the furnace so that the chemical reactions proceed very efficiently. When the frequency and amplitude of vibration are varied, the rates of reaction speed may be suitably adjusted and consequently the operation efficiency may be much increased.

(IV) In both of the oxidation and reduction furnaces the vibration is used not only for facilitating the chemical reactions but also for transporting the nuclear fuel so that considerably savings of energy may be attained. In addition, the transfer speed of nuclear fuel being processed or reprocessed may be varied by adjusting the amplitude and frequency of vibration.

(V) The nuclear fuel is reprocessed on the vibrating plates in both the oxidation and reduction furnaces so that the reprocessing operations may be visually monitored through the inspection windows.

What is claimed is:

1. Apparatus for reprocessing nuclear fuels and the sheaths thereof, comprising
   (a) a fixed generally horizontal unitary closed furnace shell member (F) containing a chamber and including
       (1) a pair of generally vertical diaphragms comprising integral end walls (11) arranged at opposite ends of said shell member;
       (2) a nuclear fuel supply port (4), an oxygen supply port (5) and an exhaust gas discharge port (6) extending generally vertically upwardly from the upper portion of said chamber; and
       (3) first and second discharge ports (7,8) extending generally vertically downwardly from the lower portion of said chamber;
   (b) a generally planar oxidation and separation plate (9) centrally arranged within said chamber and connected with said shell end walls, said plate being slightly inclined from the horizontal axis of said shell and including a plurality of holes (16) having a first small diameter and a single hole (17) having a second large diameter, said single hole being arranged directly above said second discharge port;
   (c) vibrator means (12) arranged on the exterior of said shell and extending through one of said pair of end wall diaphragms for connection with one end of said plate for vibrating said plate and said end wall diaphragms relative to said fixed shell member; and
   (d) inclined guide means (13) connected with said first discharge port and arranged beneath plurality of holes in said plate, whereby said vibrator means vibrates said plate and said end wall diaphragms to agitate said fuel during the reprocessing thereof, small particulates of reprocessed fuel thereby passing through plurality of small holes in said plate to said first discharge port via said guide means, and said larger particulates of reprocessed fuel and said fuel sheaths thereby passing through said large hole in said plate to said second discharge port.

2. Apparatus as defined in claim 1, and further comprising
   (e) heating means (1) arranged in contiguous relation with the outer surface of said shell member for heating said shell chamber during reprocessing of said fuel; and
   (f) a layer of insulation (3) extending around said heating means and the outer surface of said shell member.

* * * * *